US008441698B2

(12) United States Patent
Murray

(10) Patent No.: US 8,441,698 B2
(45) Date of Patent: May 14, 2013

(54) COMPACT HOUSING FOR A SCAN BAR ASSEMBLY

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 353 days.

(21) Appl. No.: 12/842,074

(22) Filed: Jul. 23, 2010

(65) Prior Publication Data

US 2012/0019876 A1    Jan. 26, 2012

(51) Int. Cl.
*H04N 1/04* (2006.01)

(52) U.S. Cl.
USPC ............ 358/497; 358/474; 358/475; 358/487

(58) Field of Classification Search ................... 358/497, 358/474, 475, 487, 483
See application file for complete search history.

(56) References Cited

U.S. PATENT DOCUMENTS

| 6,246,492 | B1 | 6/2001 | Chang et al. |
| 6,473,206 | B1* | 10/2002 | Fujimoto et al. .............. 358/497 |
| 6,765,702 | B2* | 7/2004 | Tang et al. .................... 358/497 |
| 2009/0034019 | A1 | 2/2009 | Hill et al. |

* cited by examiner

*Primary Examiner* — Houshang Safaipour
(74) *Attorney, Agent, or Firm* — Peyton C. Watkins

(57) ABSTRACT

A scan bar assembly having a scan element including a length direction; a drive gear; a follower gear; and a housing having a mounting region for mounting the scan element onto the housing; a first mounting member for the drive gear; and a second mounting member for the follower gear, wherein the first and second mounting members and the housing are integrally formed as a single part.

26 Claims, 11 Drawing Sheets

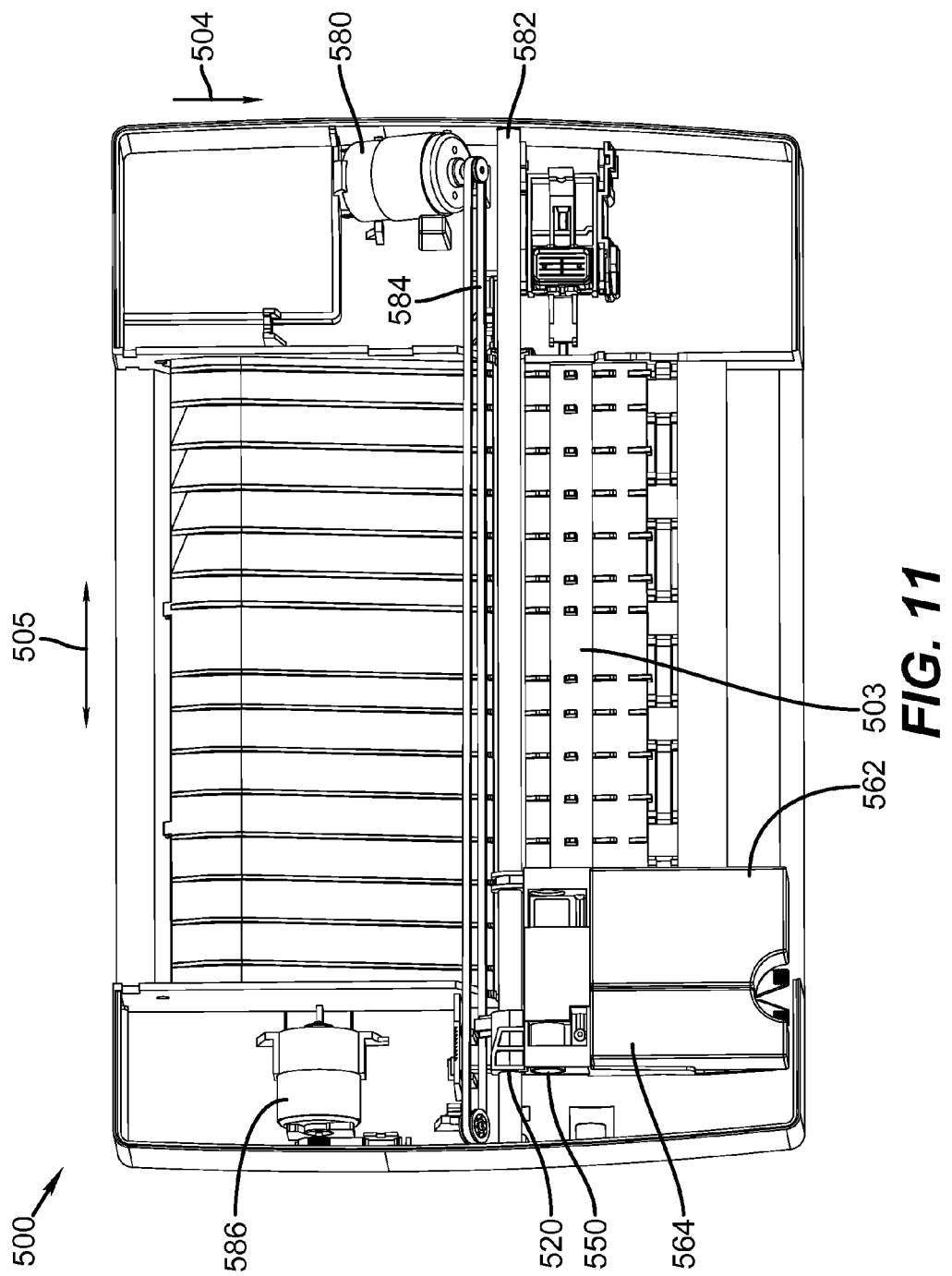

COMPACT HOUSING FOR A SCAN BAR ASSEMBLY

FIELD OF THE INVENTION

The present invention relates to a scan bar assembly for an optical scanner, and more particularly to a housing for a scan element and power transmission of the scan bar assembly.

BACKGROUND OF THE INVENTION

Optical scanners operate by imaging an object (e.g. a document) with a light source, and sensing a resultant light signal with an optical sensor array. Each optical sensor or photoreceptor in the array (typically a linear array) generates a data signal representative of the intensity of light impinged thereon for a corresponding portion of the imaged object. The data signals from the array of sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to scan bar assembly that includes the array of optical sensors, or by moving the scan bar assembly relative to the document. Either or both of these methods may be embodied in a flat bed scanner, multi-function printer, or any scanner having manual and automatic feed capabilities.

A common type of scanner uses a contact image sensor (CIS) scan bar. A CIS scan bar includes a contact image sensor scan element having a length that is substantially equal to the width of the scanning region. The photoreceptors in a CIS are substantially the same size as the pixel resolution of the scanner. The CIS has a short depth of field and is typically mounted beneath the transparent plate (scanner glass) upon which the document is placed. A scan bar assembly includes the CIS scan element, as well as gears for power transmission to move the scan bar assembly. One or more roller spacers in the CIS scan bar assembly are biased against the bottom of the scanner glass so that the CIS scan element is always at substantially the same distance from the top of the scanner glass.

U.S. Pat. No. 6,246,492 discloses a movable module, which includes a contact image sensor and a driving motor and which can slide back and forth along a track to scan an image. The driving motor exerts a force by means of a pinion on a fixed rack attached to the frame of the scanner.

US Patent Application Publication 2009/0034019 describes a scanner module including the optical components, where the scanner module is carried by a carriage that includes a motor and associated gears. FIG. 1 (prior art) is a copy of FIG. 2 of 2009/0034019 and FIG. 2 (prior art) is a copy of FIG. 4 of 2009/0034019. Scanner 120 includes platen 122, carriage 124, wheels 126, bias 128, drive 130, light source 132, reflected light capture unit 134, and sensor array (not shown). Light source 132, reflected light capture unit 134 and the sensor array are joined to one another to form a scanner module 135 which includes a body 204 and wheels 126. Module 135 is carried by carriage 124. Platen 122 includes a plate, at least a portion of which is transparent, configured to support on its top surface 144 a document or other article to be scanned. Central portion 200 includes that portion of platen 122 through which light is transmitted and through which reflected light passes. Side portions 202 may be transparent or may be opaque. Side portions 202 provide surfaces against which wheels 126 rotate. Carriage 124 carries reflected light gathering unit 134, light source 132 and the sensor array as they are moved across and along platen 122. Scan module 135 includes body 204 and two opposing wheel wells 206 that are sized to receive wheels 126, which are retained by caps 210. Bias 128 includes one or more members, such as wheels 214, configured to resiliently urge carriage 124, wheels 126 and reflected light gathering unit 134 towards platen 122. As a result, wheels 126 are maintained in constant contact with surface 152 as carriage 124 is moved across platen 122. Wheels 214 are urged against a stationary surface 216 (schematically shown) associated with the housing of scanner system 120. Drive 130 is configured to move carriage 124 in either direction as indicated by arrows 158 (called the scan direction herein). Drive 130 moves carriage 124 and reflected light gathering unit 134 across platen 122 such that a document may be scanned. In the example shown in FIGS. 1 and 2, drive 130 includes motor 220, worm gear 224, drive gear 225, pinion gears 226, 228 and rack 230 (schematically shown in FIG. 1). Motor 220 is carried by carriage 124 and is connected to an encoder (not shown). Worm gear 224 is in engagement with drive gear 225 which is part of a compound gear also including pinion gear 226. Pinion gears 226 and 228 are in engagement with rack 230. Rotation of pinion gears 226, 228 results in carriage 124 being driven along rack 230 relative to platen 122. Because scanner module 135 (FIG. 2) is made separately from carriage 124 (FIG. 1), some means of affixing scanner module 135 to carriage 124 is required. Visible in FIG. 1, but not originally labeled in 2009/0034019 are bolts 125 for attaching scanner module 135 to carriage 124. Also originally unlabeled in FIG. 1 of 2009/0034019 (but identifiable by one who is familiar with conventional scan bar designs) is gear retainer tab 127, which is typically formed of a piece of stamped metal that is bolted to carriage 124 with one of the bolts 125. A further component that is unlabeled in 2009/0034019 but that is readily identifiable in FIG. 1 is motor printed circuit board 221 that is used for connecting power to motor 220 and for attaching the rotary encoder sensor that monitors rotation of the motor axle.

The prior art scan bar assembly shown in FIGS. 1 and 2 is satisfactory in many applications. However, for small footprint scanners or multi-function printers, a limitation to the reduction in overall size can be the size of the scan bar assembly. In particular, a typical width of a scan bar assembly along a scan direction 158 (approximately the distance between outer edges of wheels 214 in FIG. 1) is about 7 centimeters or greater. A smaller footprint multi-function printer can result in improved convenience to the user, as well as cost savings. In addition it would be further advantageous for manufacturing simplification, cost reduction, and improvement of assembly tolerances of the scan bar assembly if it were not necessary to build the scanner module 135 and carriage 124 (FIG. 1) separately and then bolt them together.

SUMMARY OF THE INVENTION

The present invention is directed to overcoming one or more of the problems set forth above. Briefly summarized, according to one aspect of the invention, the invention resides in a scan bar assembly comprising a scan element including a length direction; a drive gear; a follower gear; and a housing comprising: a mounting region for mounting the scan element onto the housing; a first mounting member for the drive gear; and a second mounting member for the follower gear, wherein the first and second mounting members and the housing are integrally formed as a single part.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 11 is a top view of a printing mechanism that can be integrated together with the scanner unit of FIGS. 8-10 to provide a multi-function printer.

DETAILED DESCRIPTION OF THE INVENTION

Figure 2:
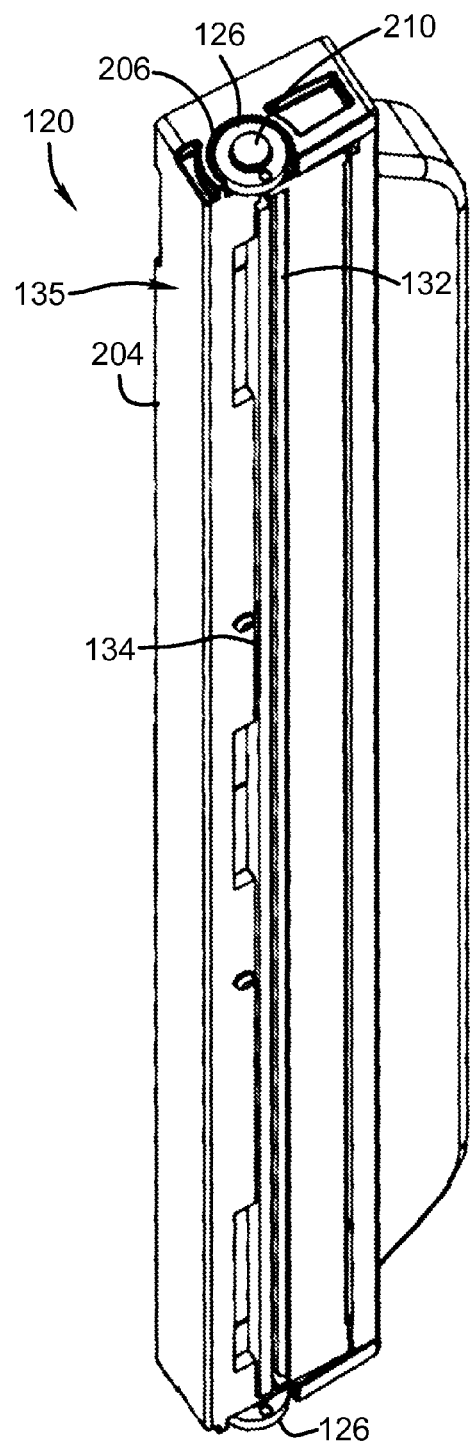
FIG. 2 shows a top perspective view of a scanner module of the prior art scanner of FIG. 1.
Figure 3:
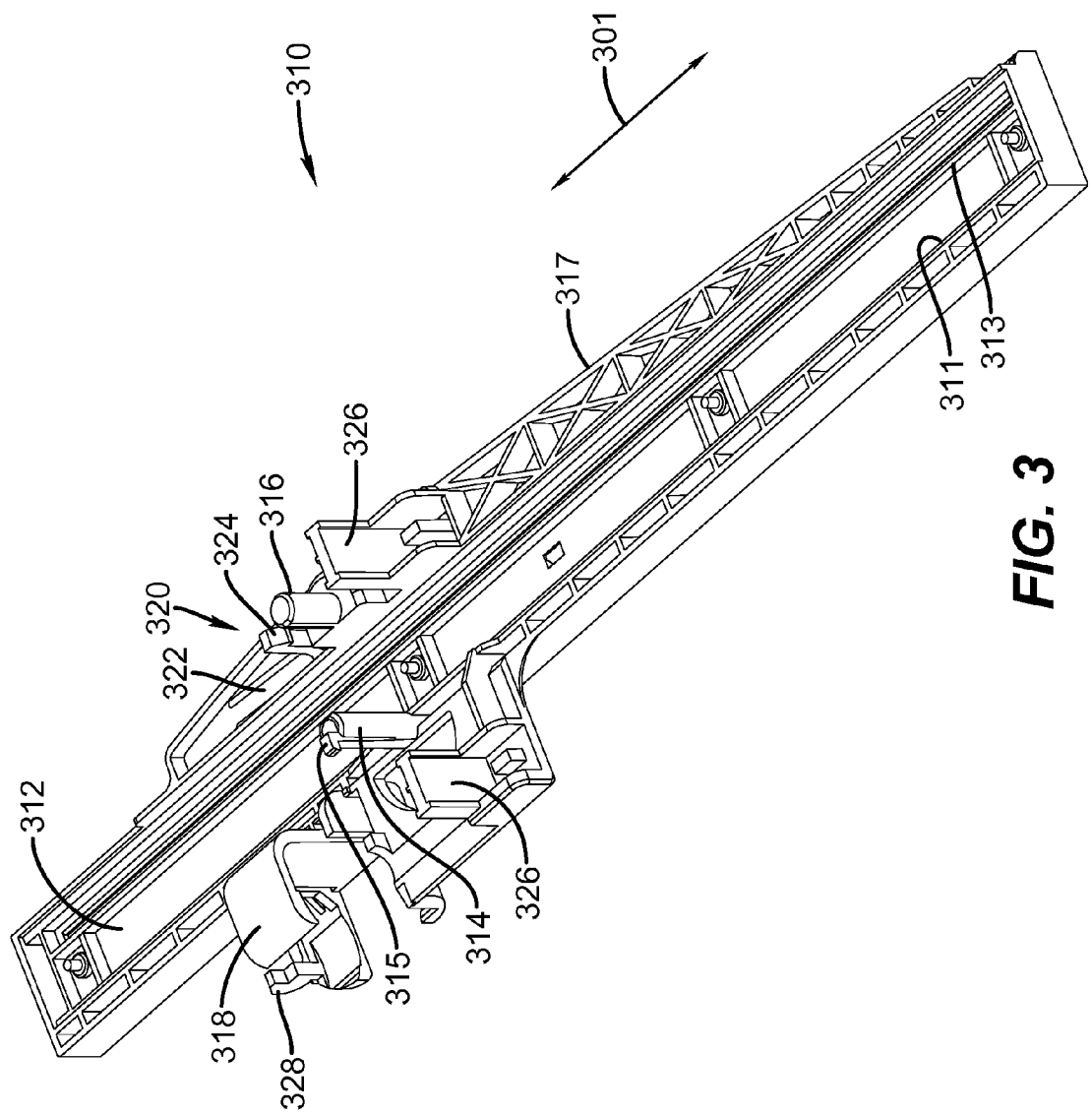
FIG. 3 is a bottom perspective view of a housing for a scan bar assembly according to an embodiment of the present invention.
Figure 7:
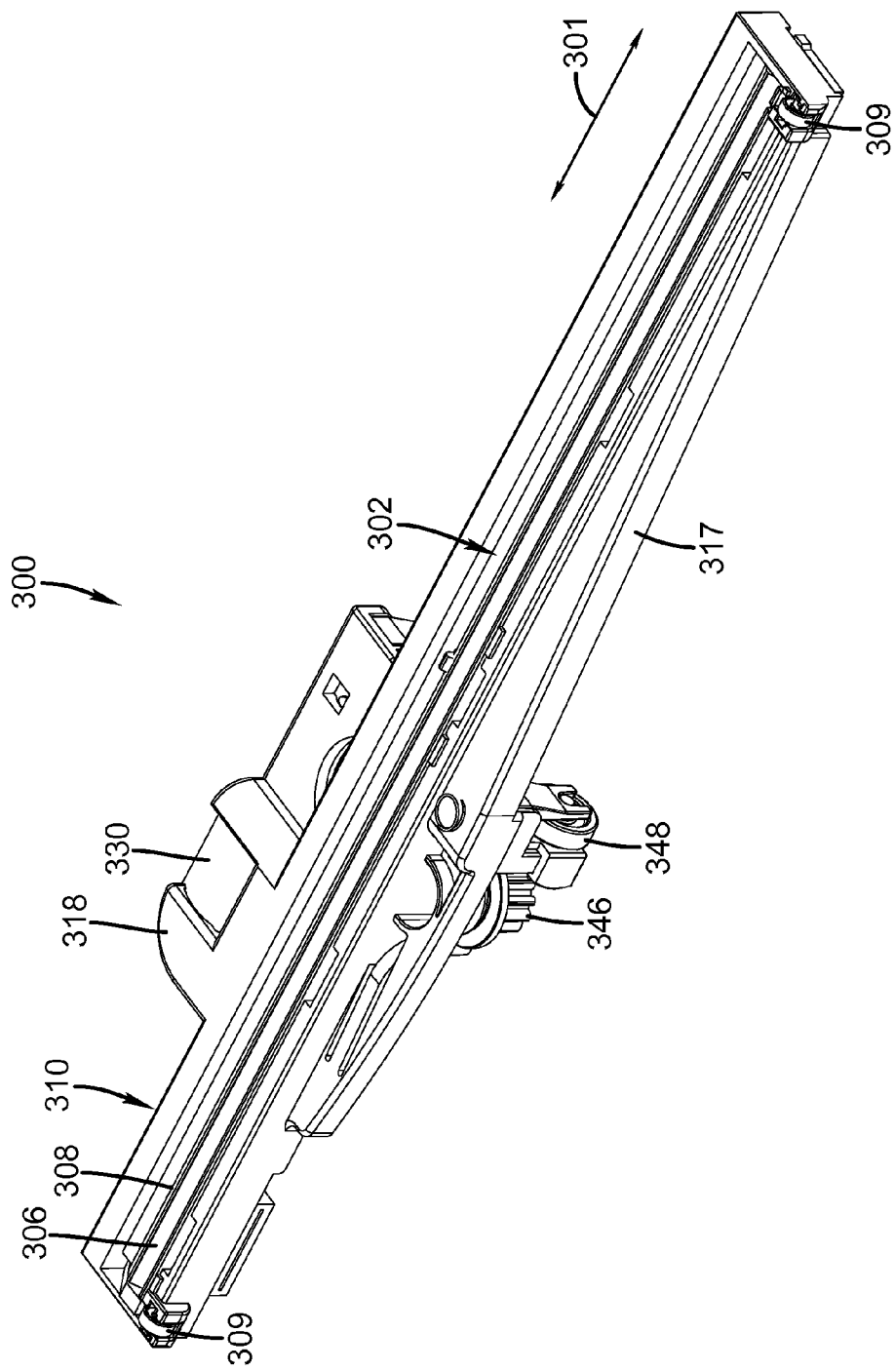
FIG. 7 is a top perspective view of a portion of the scan bar assembly shown in FIG. 4.

FIG. 3 is a bottom perspective view of a housing 310 for a scan bar assembly 300 (see FIG. 4) according to an embodiment of the present invention. Housing 310 includes a mounting region 312 for a scan element 302 (see FIGS. 4 and 7), a first mounting member 314 for a drive gear 340 (see FIG. 4), a second mounting member 316 for a follower gear 346 (see FIG. 4) and a clip 318 for mounting a motor 330 (see FIG. 4). In other words, housing 310, which can be integrally formed as a single part by injection molding, for example, is configured for attachment of the optical components as well as the power transmission components for moving the scan bar assembly 300. Therefore it is not required to bolt together a scan module containing optical components and a carriage containing power transmission components as in the prior art shown in FIGS. 1 and 2. In addition to facilitating assembly of the scan bar, using a single integrally formed housing for the optical components and the power transmission components also provides tighter tolerances in the relative location and orientation of the scan element and the gears that control its motion within the scanner. Mounting region 312 includes a first wall 311 and a second wall 313 that is opposite the first wall 311. The first mounting member 314 is located near first wall 311, and the second mounting member 316 is located near second wall 313. In the example shown in FIG. 3, housing 310 includes an outer wall 317 that is located near second wall 313. Unlike first wall 311 and second wall 313, which are substantially parallel to length direction 301, outer wall 317 is bowed outwardly in the region near second mounting member 316 and then tapers toward its ends, as also shown in FIG. 7.

Figure 1:
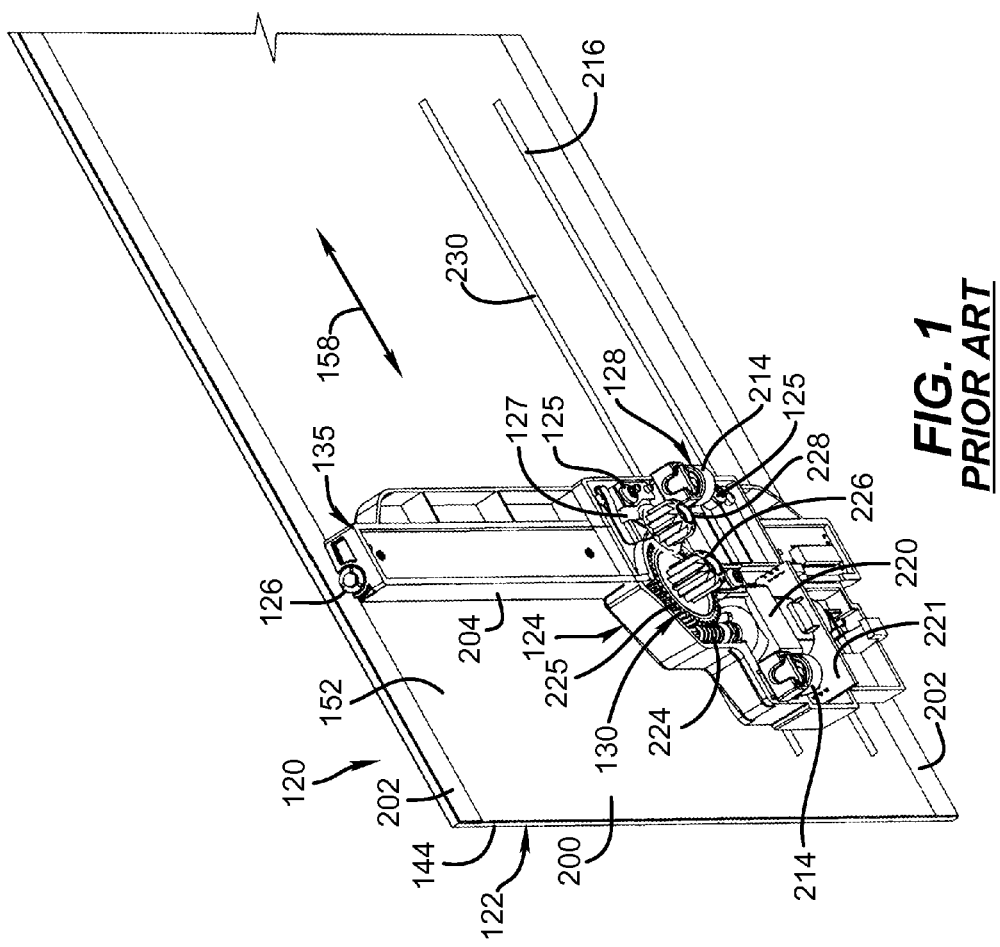
FIG. 1 shows a prior art scanner.

Other features that are integrally formed with housing 310 and that are shown in FIG. 1 are a gear retention member 320, including a cantilevered arm 322 and an end 324 located near the second mounting member 316; a pair of roller mount extensions 326; a support 328 for the motor printed circuit board, and a gear retaining member 315. The provision of these features in a single part housing 310 helps to reduce manufacturing cost in terms of parts count and ease of assembly. In addition, as described below, the locations provided for components that are assembled onto housing 310 enable a reduction in the width of the scan bar assembly by about one centimeter (about 15%).

Figure 4:
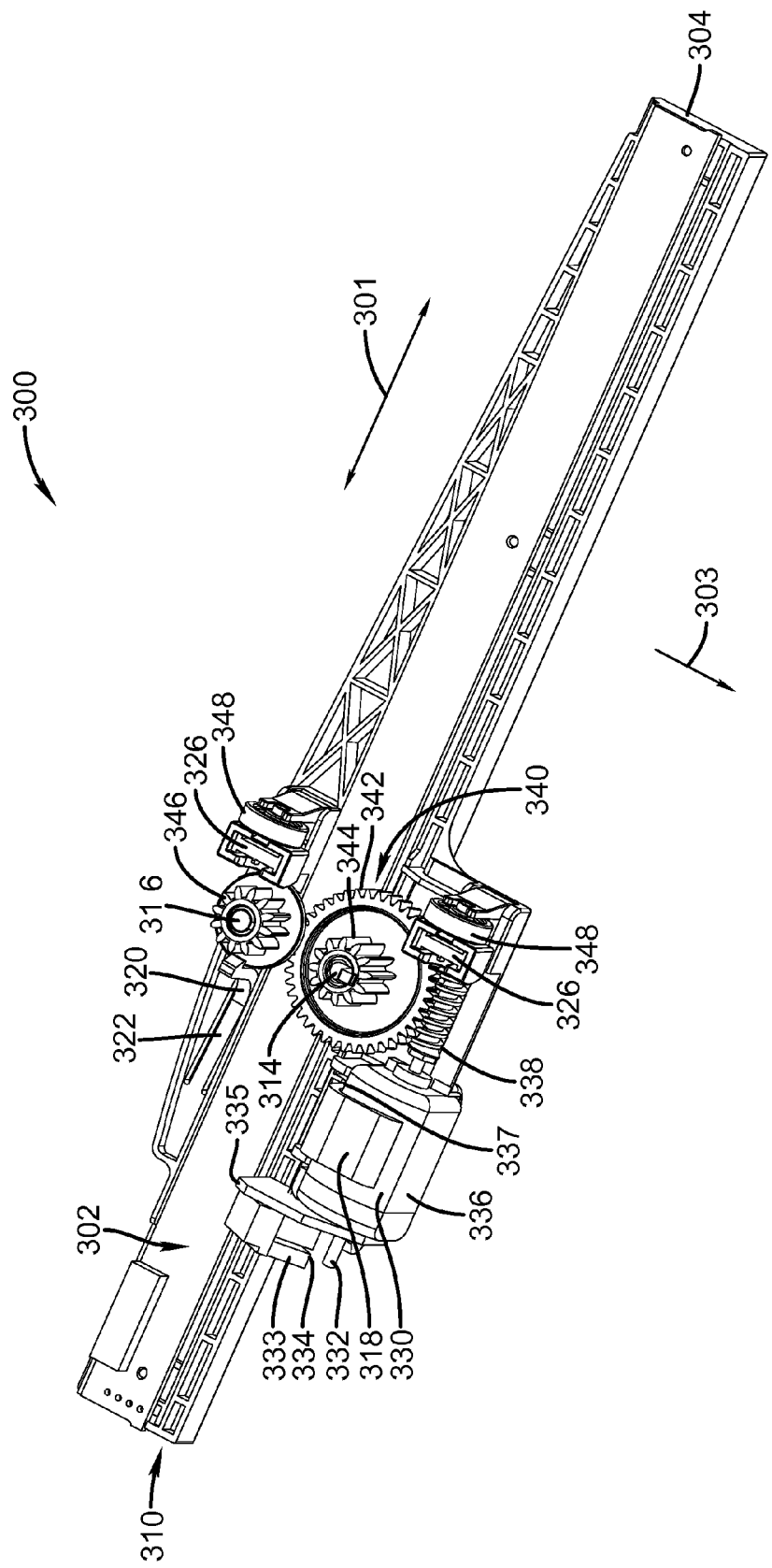
FIG. 4 is a bottom perspective view of a scan bar assembly including components mounted onto the housing of FIG. 3.

FIG. 4 shows a bottom perspective view of scan bar assembly 300, which includes housing 310 of FIG. 3, plus optical and power transmission components assembled onto it. Scan element 302 is mounted in mounting region 312 (see FIG. 3), and includes a printed circuit board 304, as well as a light pipe 306 and a lens 308 that are shown in the top view of FIG. 7, and a photoreceptor array (not shown). Scan element 302 extends along length direction 301, along which also the photoreceptor array (not shown) extends. The scan direction 303 along which the scan bar assembly 300 is moved during scanning an image is also indicated, and is substantially perpendicular to length direction 301. Motor 330 is snap fitted into clip 318 and includes an axle 332. Near one end of axle 332 is an encoder sensor 333 that includes a slot 334 through which an encoder disk (not shown) passes in order to monitor the rotation of axle 332. Encoder sensor 333 is mounted on a printed circuit board 335 that also provides power to motor 330. On the other end of axle 332 is mounted worm gear 338. Drive gear 340 is a compound gear that is mounted on first mounting member 314. Drive gear 340 includes a first gear 342 that is engaged with worm gear 338. Drive gear 340 also includes a second gear 344 that is coaxial with first gear 342. Follower gear 346 is mounted on second mounting member 316. A pair of idle rollers 348 are mounted respectively on roller mount extensions 326 (see FIG. 3). Optionally a spring bias is provided to the idle roller 348 that is closest to follower gear 346 in order to push spacer rollers 309 (see FIGS. 7 and 10) into contact with the underside of the platen glass.

Motor 330 includes an innermost side 337 that is located near first wall 311 of housing 310, and an outermost side 336 that is located opposite the innermost side 337. The outermost side 336 and innermost side 337 of motor 330 are substantially parallel to length direction 301 of scan element 302. In order to reduce the width of the scan bar assembly 300 along a direction parallel to the scan direction 303, the idle roller 348 and corresponding roller mount extension 326 closest to the motor 330 is positioned so that it does not extend beyond the outermost side 336 of the motor 330, in contrast to the prior art shown in FIG. 1. In addition in FIG. 4 it can be seen that the printed circuit board 335 for motor 330 is also positioned so that it does not extend beyond the outermost side 336 of motor 330, in contrast to the prior art shown in FIG. 1. In fact, as seen in FIGS. 4 and 7, no component of scan bar assembly 300 that is mounted on housing 310 extends beyond outermost side 336 of motor 330. In this way it has been found possible to reduce the width of the scan bar assembly 300 along a direction parallel to scan direction 303 to six centimeters or less.

Figure 5:
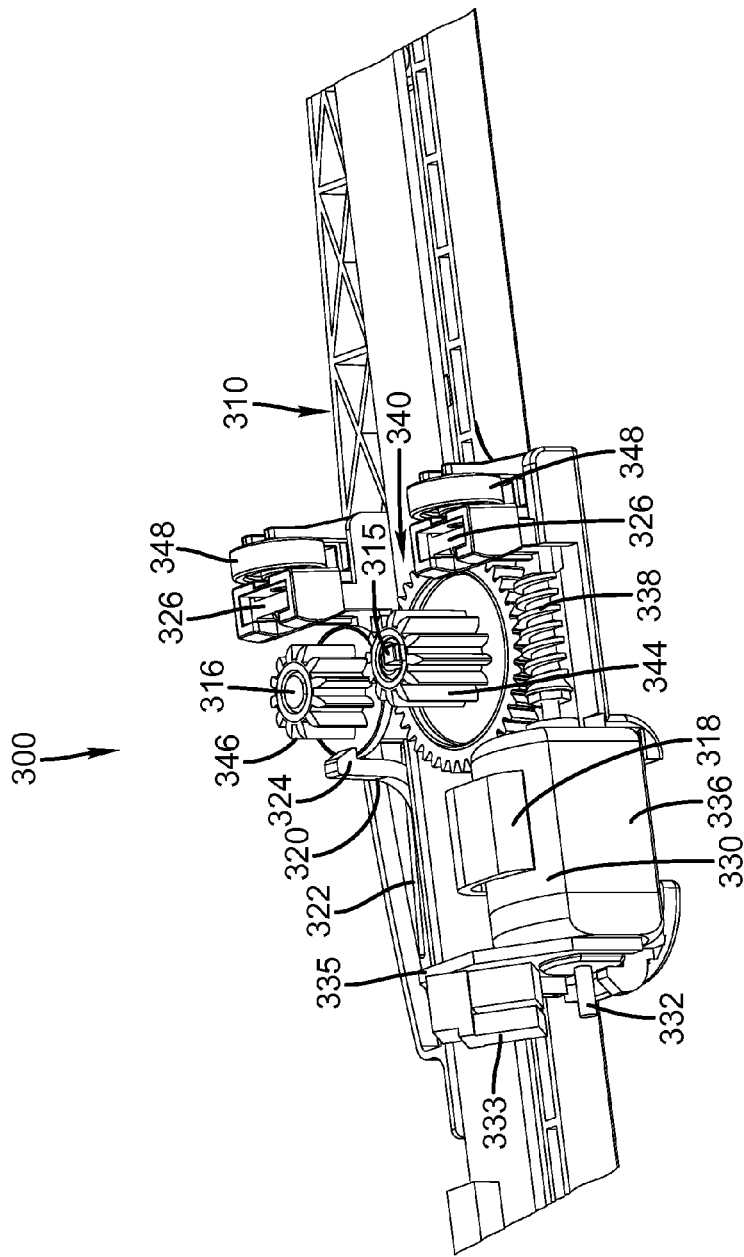
FIG. 5 is a close-up bottom perspective view of a portion of the scan bar assembly shown in FIG. 4.
Figure 6:
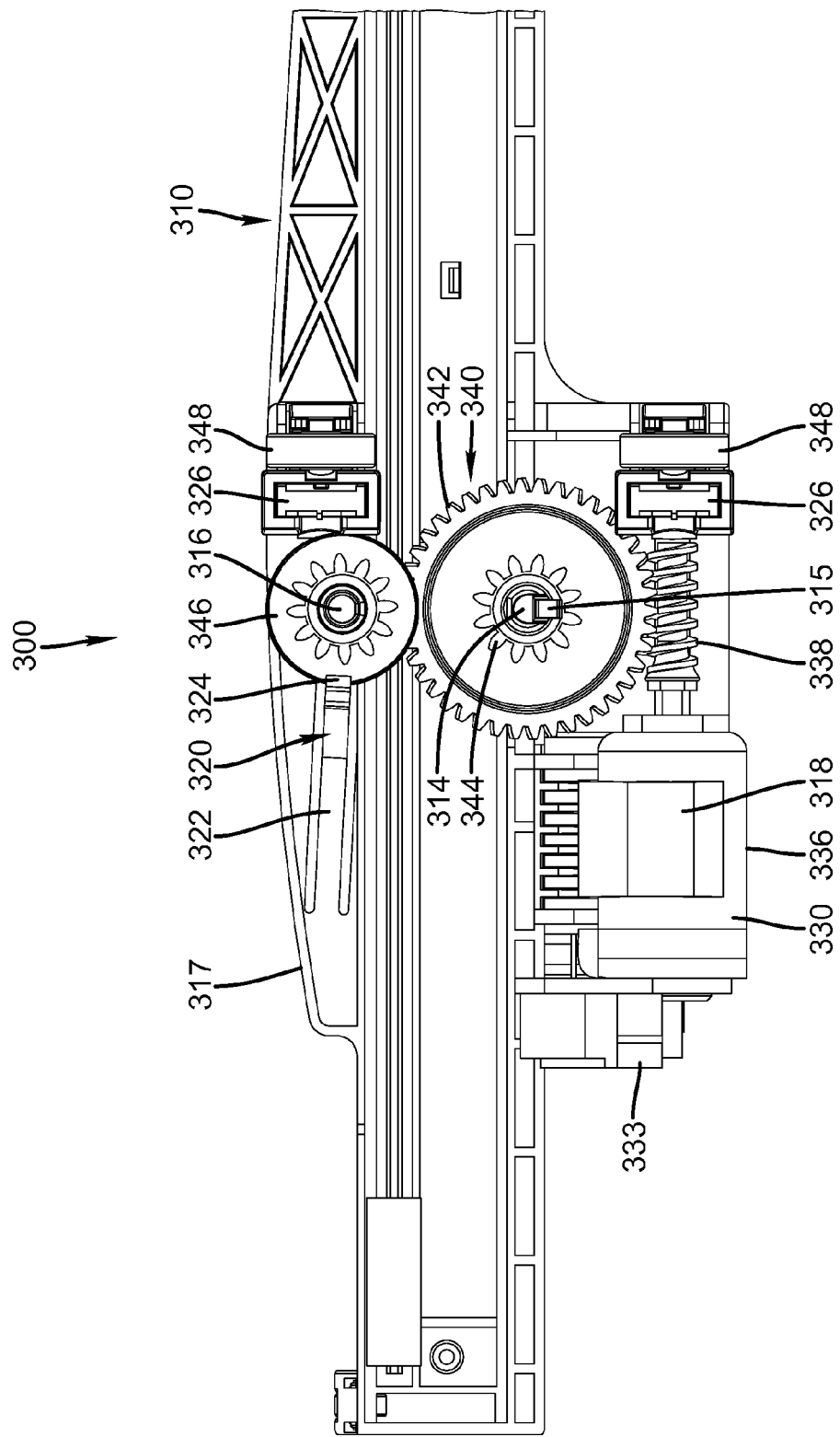
FIG. 6 is a close-up bottom view of a portion of the scan bar assembly shown in FIG. 4.

FIG. 5 provides a close-up perspective bottom view that is rotated somewhat relative to FIG. 4, in order to more clearly show the power transmission portion of scan bar assembly 300. FIG. 6 is a close-up bottom view that shows some of the same features, but at a different angle. The end 324 of gear retention member 320 is shown in contact with a rim of follower gear 346. Cantilevered arm 322 of gear retention member 320 provides a spring force so that end 324 in contact with gear retention member 320 provides a frictional drag on follower gear 346 that helps to smooth the motion of the scan bar assembly 300. A similar function is provided by prior art gear retainer tab 127 (see FIG. 1). However, gear retainer tab 127 is formed of stamped metal and is an additional component that must be assembled onto the prior art scan bar assembly. Integrally formed gear retention member 320 of the present invention provides the functions of holding the follower gear 346 in place and providing a frictional load without requiring an additional component to be assembled onto housing 310. Also shown in FIGS. 5 and 6 is gear retaining member 315 (also see also FIG. 3) that is located near the axis of rotation of the drive gear 340 and that helps to keep drive gear 340 attached to housing 310.

FIG. 7 shows a top perspective view of scan bar assembly 300. Such a top perspective view is what would be seen if one opened the lid of a scanner and looked through the scanner glass. The optical components of scan element 302 are positioned near the top side of scan bar assembly 300. Light pipe 306 provides illumination to the document to be scanned. Reflected light is gathered through lens 308 and directed to a linear photoreceptor array (not shown). Spacer rollers 309 at each end of scan bar assembly 300 are pushed into contact with the bottom surface of the scanner glass by the spring mounted idle roller 348 located near follower gear 346. Motor 330 and a portion of its associated mounting clip 318 are also visible in this view.

A method of making a scan bar assembly 300 will next be described with reference to FIGS. 3-7. Housing 310 is provided including a mounting region 312, a first gear-mounting member 314 and a second gear-mounting member 316. Housing 310 is integrally formed by injection molding, for example. A motor 330 is affixed to housing 310, for example by snap fitting the motor 330 to a clip 318 that is also integrally formed with housing 310. A scan element 302 is mounted in mounting region 312 of housing 310. A drive gear 340 is mounted on the first gear-mounting member 314. A follower gear 346 is mounted on the second gear-mounting member 316. A gear retention member 320 can be integrally formed with housing 310 and the step of mounting the follower gear 346 can include positioning follower gear 346 such that an end 324 of the gear retention member 320 is in contact with the follower gear 346. The method can further include mounting an idle roller 348 on housing 310. In order to provide a biasing force, mounting of idle roller 348 can further include mounting a spring as part of the idle roller assembly. The method can further include connecting a printed circuit board 335 for providing power to the motor 330. The method can also include providing a rotary encoder disk on an axle 332 of motor 330 and providing an encoder sensor 333 on printed circuit board 335 for monitoring the rotation of axle 332.

Figure 8:
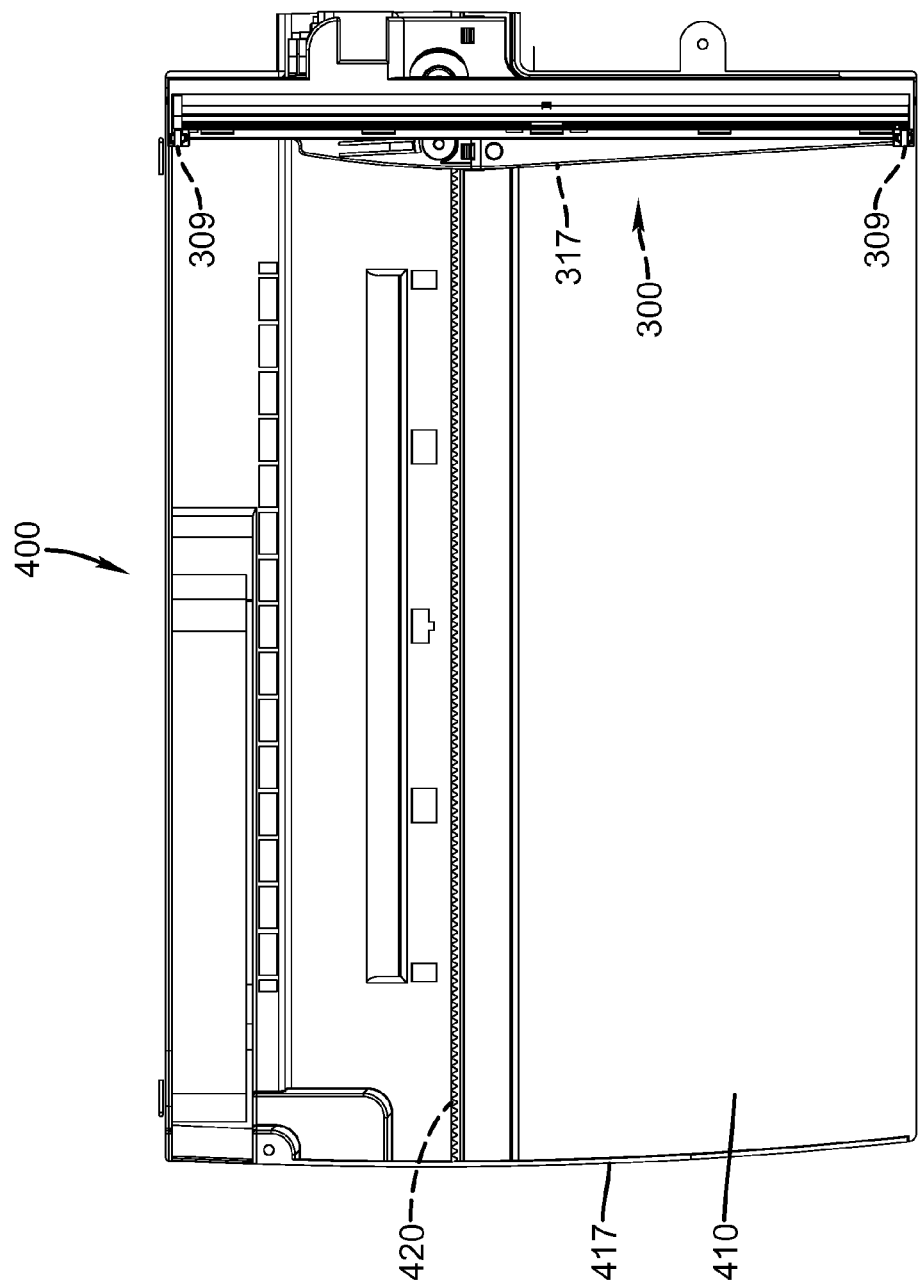
FIG. 8 is a top view of a portion of a scanner unit including the scan bar assembly shown in FIG. 4.
Figure 9:
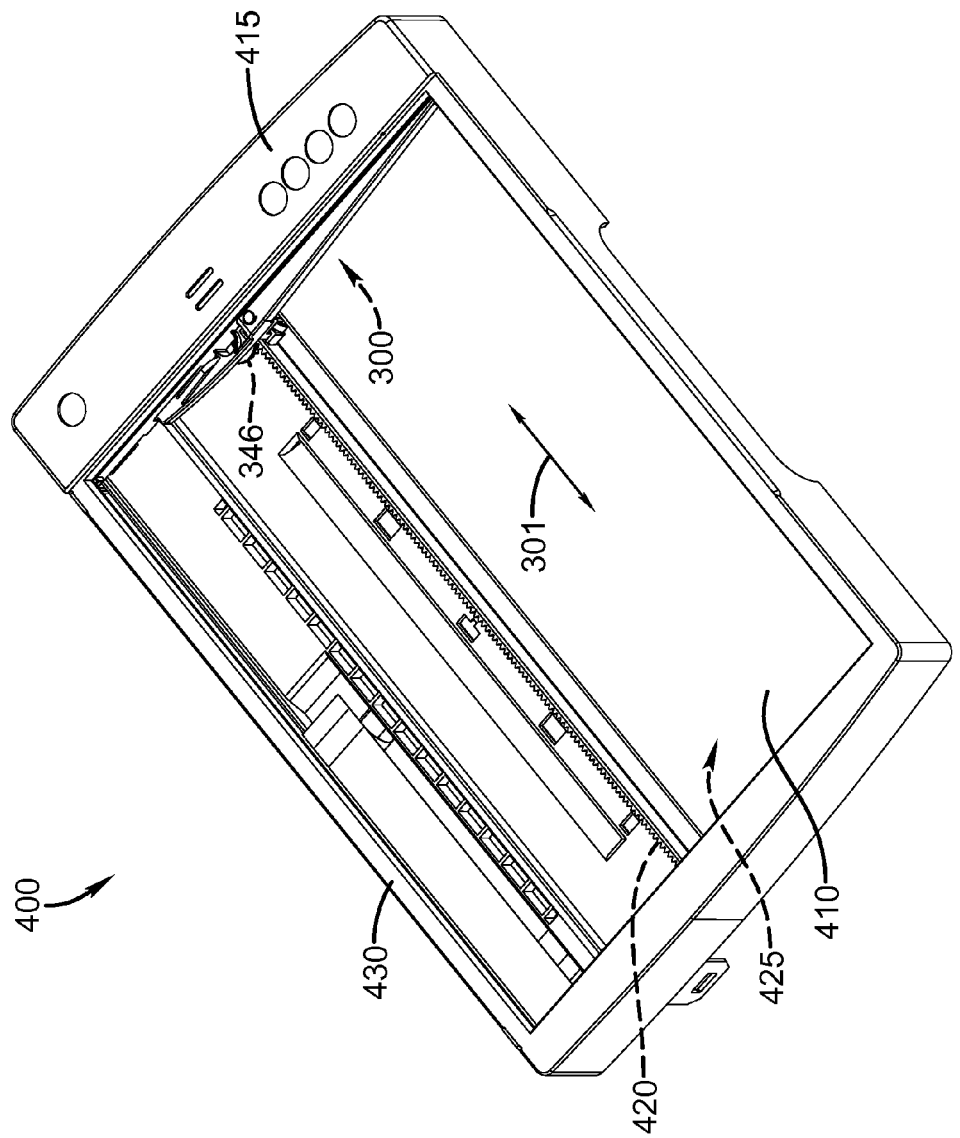
FIG. 9 is a perspective view of a portion of a scanner unit including the scan bar assembly shown in FIG. 4.

FIG. 8 shows a top view and FIG. 9 shows a top perspective view of portions of scanner unit 400 with the lid removed so that more components are visible. Spacer rollers 309 of scan bar assembly 300 are in contact with the bottom of scanner glass 410. Scanner glass 410 (also generically called a transparent platen herein) is held by holder 430 (see FIG. 9) of frame 425. Rack 420 extends across the floor of frame 425 of scanner unit 400. In FIG. 9 a portion of follower gear 346 is seen near rack 420. Control panel 415 (seen in FIG. 9 but removed in FIG. 8) is used to control functions (such as copying or scanning) of the imaging system 400. In this example, scanner unit 400 includes a curved side 417 that is able to curve inward toward its ends and still have scan bar assembly 300 fit next to curved side 417 due to the tapering of outer wall 317 of scan bar assembly 300. This inward curve allows a smaller footprint of scanner unit 400, and also provides an aesthetically pleasing look as an additional benefit.

Figure 10:
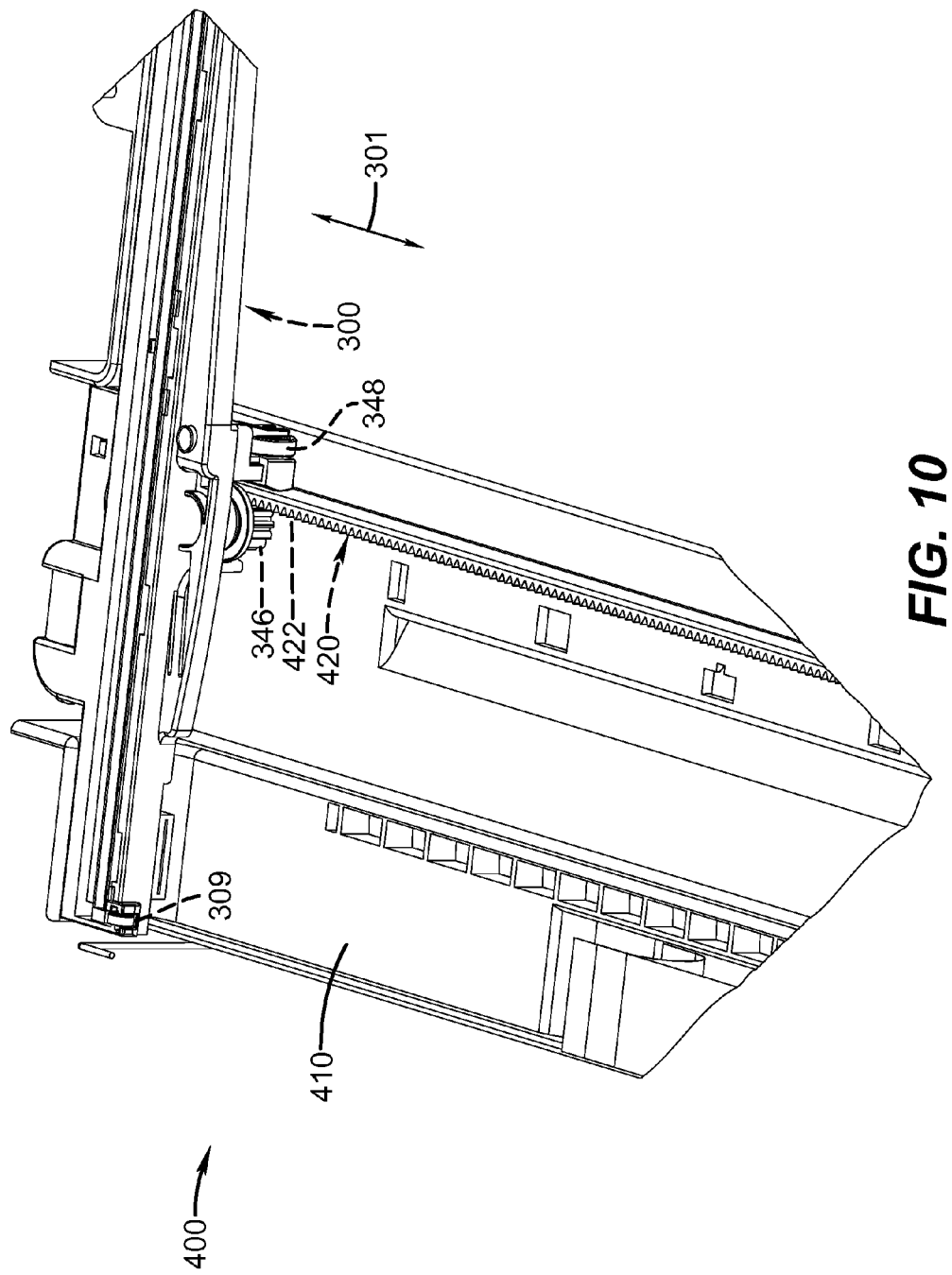
FIG. 10 is a close-up perspective view of a portion of a scanner unit including the scan bar assembly shown in FIG. 4.

FIG. 10 shows a close up top perspective view of a portion of scanner unit 400. More clearly visible at this magnification and viewing angle is the engagement of follower gear 346 with rack teeth 422 of rack 420 that enables scan bar assembly 300 to move along scan direction 301. The second gear of the drive gear (not shown) is also engaged with the rack teeth, but it is not visible in the view of FIG. 10. Idle roller 348 is also shown riding on the floor of the frame 425 below scanner glass 410. A spacer roller 309 is shown riding on the bottom of the scanner glass 410.

Scanner unit 400 can be a stand-alone scanner of an imaging system. Alternatively an imaging system can also include a printing mechanism as part of a multifunction printer. FIG. 11 shows a top view of an inkjet printing mechanism 500 that can be part of an imaging system together with scanner unit 400. Some of the parts of the printing mechanism 500 have been hidden in the view shown in FIG. 11 so that other parts can be more clearly seen. Paper (not shown) is advanced by paper advance motor 586 along paper advance direction 504. Printing mechanism 500 has a print region 503 across which carriage 520 is moved back and forth in carriage guide direction 505, while drops are ejected to print an image using printhead 550 that is mounted on carriage 520. Multichamber ink tank 562 and single chamber ink tank 564 are mounted in a holding receptacle of printhead 550. Carriage motor 580 moves belt 584 to move carriage 520 along carriage guide 582. For an imaging system including both a scanner unit 400 and a printing mechanism 500, functions including copying, scanning and printing can all be performed. Optionally such an imaging system is connected to a host computer (not shown).

PARTS LIST

120 Scanner
122 Platen
124 Carriage
125 Bolt
126 Wheel
127 Gear retainer tab
128 Bias
130 Drive
132 Light source
134 Reflected light capture unit
135 Scanner module
144 Top surface
152 Surface
158 Scan direction
200 Central portion
202 Side portion
204 Body
206 Well
210 Cap
214 Wheel
216 Stationary surface
220 Motor
221 Motor printed circuit board
224 Worm gear
225 Gear
226 Pinion gear
228 Pinion gear
230 Rack
300 Scan bar assembly
301 Length direction 302 Scan element
303 Scan direction
304 Printed circuit board (for scan element 302)
306 Light source
308 Lens
309 Spacer roller
310 Housing
311 First wall
312 Mounting region
313 Second wall
314 First mounting member
315 Gear retaining member
316 Second mounting member
317 Outer wall
318 Clip
320 Gear retention member
322 Cantilevered arm
324 End
326 Roller mount extension
328 Support (for motor PC board 334)
330 Motor
332 Axle
333 Encoder sensor
334 Slot
335 Printed circuit board (for motor 330)
336 Outermost side
337 Innermost side
338 Worm gear
340 Drive gear
342 First gear
344 Second gear
346 Follower gear
348 Idle roller(s)
400 Scanner unit
410 Scanner glass
415 Control panel
417 Curved side
420 Rack
422 Rack teeth
425 Frame
430 Holder
500 Printing mechanism
503 Print region
504 Paper advance direction
505 Carriage guide direction
520 Carriage
550 Printhead
562 Multichamber ink tank
564 Single chamber ink tank
580 Carriage motor
582 Carriage guide direction
584 Belt
586 Paper advance motor

The invention claimed is:

1. A scan bar assembly comprising:
a scan element including a length direction;
a drive gear;
a follower gear; and
a housing comprising:
a mounting region for mounting the scan element onto the housing;
a first mounting member for the drive gear; and
a second mounting member for the follower gear, wherein the first and second mounting members and the housing are integrally formed as a single part; and
a motor including an axle; wherein the motor includes an outermost side that is substantially parallel to length direction of the scan element, wherein no scan bar assembly component that is mounted on the housing extends beyond the outermost side of the motor.

2. The scan bar assembly of claim 1, the mounting region including a first wall and a second wall that is opposite the first wall, wherein the first mounting member is proximate the first wall and the second mounting member is proximate the second wall.

3. The scan bar assembly of claim 1 further comprising a clip for snap fitting the motor to the housing, wherein the clip is integrally formed with the housing.

4. The scan bar assembly of claim 1 further comprising a worm gear mounted on the motor axle.

5. The scan bar assembly of claim 4, wherein the drive gear is a compound gear including a first gear and a second gear, and wherein the first gear is engaged with the worm gear.

6. The scan bar assembly of claim 1, wherein the first mounting member comprises an axial mounting member and gear retaining member located proximate the axis of rotation of the drive gear.

7. A scan bar assembly comprising:
a scan element including a length direction;
a drive gear;
a follower gear; and
a housing comprising:
a mounting region for mounting the scan element onto the housing;
a first mounting member for the drive gear; and
a second mounting member for the follower gear, wherein the first and second mounting members and the housing are integrally formed as a single part;
a gear retention member that is integrally formed with the housing.

8. The scan bar assembly of claim 7, wherein the gear retention member comprises a cantilevered arm.

9. The scan bar assembly of claim 7, wherein the gear retention member includes an end that is in contact with the follower gear.

10. An imaging system comprising:
a transparent platen;
a frame including:
a holder for the transparent platen; and
a rack having a row of rack teeth; and
a scan bar assembly comprising:
a scan element;
a motor including an axle;
a drive gear powered by the motor;
a follower gear; and
a housing comprising:
a mounting region for mounting the scan element onto the housing;
a first mounting member for the drive gear; and
a second mounting member for the follower gear, wherein the first and second mounting members and the housing are integrally formed as a single part;
wherein the motor includes an innermost side located proximate a first wall of the mounting region, and an outermost side disposed opposite the innermost side, wherein no scan bar assembly component that is mounted on the housing extends beyond the outermost side of the motor.

11. The imaging system of claim 10, the mounting region including the first wall and a second wall that is opposite the first wall, wherein the first mounting member is proximate the first wall and the second mounting member is proximate the second wall.

12. The imaging system of claim 10 further comprising a clip for snap fitting the motor to the housing, wherein the clip is integrally formed with the housing.

13. The imaging system of claim 10 further comprising a gear retention member that is integrally formed with the housing.

14. The imaging system of claim 10, wherein the gear retention member includes an end that is in contact with the follower gear.

15. The imaging system of claim 10, further comprising a worm gear mounted on the motor axle.

16. The imaging system of claim 15, wherein the drive gear is a compound gear including a first gear and a second gear, and wherein the first gear is engaged with the worm gear.

17. The imaging system of claim 16, wherein the follower gear and the second gear of the compound gear are engaged with the row of rack teeth.

18. The imaging system of claim 10, wherein the first mounting member comprises a gear axle and a retaining member located proximate the axis of rotation of the drive gear.

19. The imaging system of claim 10 further comprising a scan direction of the scan bar assembly, wherein a width of the scan bar assembly along a direction parallel to the scan direction is less or equal to 6 centimeters.

20. The imaging system of claim 10 further comprising a curved side, wherein the housing of the scan bar assembly further comprises a tapered outer wall so that the housing can fit next to the curved side.

21. The imaging system of claim 10 further comprising a printing mechanism.

22. A method of making a scan bar assembly for an imaging system, the method comprising:
   a) providing a housing including a mounting region, a first gear-mounting member and a second gear-mounting member, wherein the mounting region and the two gear-mounting members are integrally formed as a single part;
   b) affixing a motor to the housing;
   c) mounting a scan element in the mounting region;
   d) mounting a drive gear on the first gear-mounting member; and
   e) mounting a follower gear on the second gear-mounting member; wherein the housing further including a clip, wherein the step of affixing the motor to the housing comprises snap fitting the motor to the clip and the housing further includes an integrally formed gear-retention member proximate the second gear-mounting member, wherein the step of mounting the follower gear further comprises positioning the follower gear such that an end of the gear-retention member is in contact with the follower gear.

23. The method according to claim 22 further comprising the step of mounting an idle roller assembly on the housing.

24. The method according to claim 23, wherein the step of mounting the idle roller assembly further comprises mounting a spring to bias the idle roller assembly.

25. The method according to claim 22 further comprising the step of connecting a circuit board to the motor.

26. The method according to claim 25 further comprising providing a rotary encoder disk on an axle of the motor and providing an encoder sensor on the circuit board.

* * * * *